(12) United States Patent
Uhl

(10) Patent No.: US 7,573,635 B2
(45) Date of Patent: Aug. 11, 2009

(54) MICROSCOPE DEVICE

(75) Inventor: Rainer Uhl, Graefelfing (DE)

(73) Assignee: TILL I.D. GmbH, Graefelfing (DE)

( * ) Notice: Subject to any disclaimer, the term of this patent is extended or adjusted under 35 U.S.C. 154(b) by 76 days.

(21) Appl. No.: 11/558,122

(22) Filed: Nov. 9, 2006

(65) Prior Publication Data
US 2007/0153373 A1 Jul. 5, 2007

(30) Foreign Application Priority Data
Nov. 11, 2005 (DE) .................. 10 2005 054 332
Jun. 21, 2006 (DE) .................. 10 2006 028 530

(51) Int. Cl.
*G02B 21/06* (2006.01)
*G02B 21/00* (2006.01)

(52) U.S. Cl. ............... 359/388; 359/368; 359/385

(58) Field of Classification Search ......... 359/368–390, 359/431, 831–837
See application file for complete search history.

(56) References Cited

U.S. PATENT DOCUMENTS

| | | | | |
|---|---|---|---|---|
| 3,490,828 A | * | 1/1970 | Eberhard | 359/388 |
| 4,060,322 A | * | 11/1977 | Hirayama et al. | 355/60 |
| 4,674,845 A | * | 6/1987 | Matsumura | 359/377 |
| 4,961,636 A | * | 10/1990 | Gaul et al. | 359/381 |
| 5,706,128 A | * | 1/1998 | Greenberg | 359/385 |
| 5,737,121 A | * | 4/1998 | Dixon | 359/388 |
| 6,787,745 B2 | * | 9/2004 | Hajjar et al. | 250/201.1 |
| 2004/0174523 A1 | | 9/2004 | Uhl et al. | |
| 2005/0174631 A1 | * | 8/2005 | Nishiwaki et al. | 359/388 |

FOREIGN PATENT DOCUMENTS

| | | |
|---|---|---|
| DE | 19960807 C1 | 2/2001 |
| DE | 10233549 A1 | 2/2004 |
| DE | 10309269 A1 | 9/2004 |
| DE | 10328308 A1 | 1/2005 |
| WO | 2004077121 A1 | 9/2004 |

* cited by examiner

*Primary Examiner*—Thong Nguyen
(74) *Attorney, Agent, or Firm*—David S. Safran; Roberts Mlotkowski Safran & Cole, P.C.

(57) ABSTRACT

There is provided a method for a microscope device for optionally examining a sample by at least a first light beam bundle from a first direction or a second light beam bundle from a second direction different to the first direction, having a microscope objective and a beam deflection element, wherein the beam deflection element is operable by a drive in order to optionally couple the first light beam bundle or the second light beam bundle into the microscope objective, and wherein the beam deflection element is rotatable by the drive in order to optionally change at least an exit direction of the first light beam bundle from the beam deflection element if the first light beam bundle is coupled into the microscope objective.

8 Claims, 7 Drawing Sheets

MICROSCOPE DEVICE

BACKGROUND OF THE INVENTION

1. Field of the Invention

The present invention relates to a microscope device which allows for examination of a sample in at least two different illumination modes.

2. Description of Related Art

Recent microscopic examination methods frequently require the use of different illumination methods and illumination modes and their combined utilization in a single device. According to WO 2004/077121 A1, for example, a "beam hub" concept is proposed, wherein beam multiplex elements which can be actuated allow for the selection of certain illumination beams from a plurality of possible illumination beams.

DE 102 33 549 A1 relates to a scanning microscope having a light source that generates an illuminating beam for illumination of a sample, which can be directed through or over the sample by a beam deflection device. A further light source generates a manipulation light beam which likewise can be directed through or over the sample by the beam deflection device.

It is a first object of the invention to provide for a microscope device for optional examination of a sample by at least a first light beam bundle and a second light beam bundle, wherein it is possible to switch in a simple manner between the first and the second light beam bundle for illumination and wherein further at least one geometric property of the selected light beam bundle should be adjustable in a simple manner in the object plane.

It is a further object of the invention to provide for a microscope device for examination of a sample, wherein at least two different geometric properties of a light beam bundle are adjustable in a simple manner in the object plane.

SUMMARY OF THE INVENTION

According to the invention, the first object is achieved by a microscope device in which a beam deflection element is operable by means of a drive in order to couple a selected one of a first light beam bundle and a second light beam bundle into the microscope objective, and in which the beam deflection element is rotatable by means of the drive in order to change at least an exit direction of the first light beam bundle from the beam deflection element when said first light beam bundle is coupled into the microscope objective. This solution is beneficial in that by actuating the drive of the beam deflection element one cannot only switch between the first and the second light beam bundle as the light source, i.e. the beam deflection element serves to selectively deflect one of the two beam bundles into the microscope objective, but simultaneously one also can change the exit direction of the selected light beam bundle from the beam deflection element in a selective manner in order to selectively adjust at least one geometric property of the light beam bundle in the object plane. Since for both functions only a single element, namely the beam deflection element, is required, a particularly simple construction of the microscope device can be achieved.

According to a preferred embodiment the beam deflection element is arranged in or close to a plane which is conjugate to the plane of the objective pupil, wherein then a rotation of the beam deflection element causes a shift of the position of the first light beam bundle in one dimension in the object plane without substantially changing the impingement direction of the first light beam bundle in the object plane and without resulting in a vignetting effect caused by shading effects in the objective pupil. Thus, by actuation of the beam deflection element an illumination pattern can be moved in a simple and selective manner in one direction over the specimen, and the sample can be scanned at least in one dimension. This is necessary if a FRAP (Fluorescence Recovery After Photo Bleaching) illumination—which is preferably realized by laser light—is used or if confocal layer images are to be taken by structured illumination or by scanning by a dot pattern or a bar pattern.

According to another embodiment the beam deflection element is arranged in or close to a plane conjugate to the object plane, wherein rotation of the beam deflection element causes a change of the angle of incidence of the first light beam bundle in the object plane, without essentially changing the point of impingement of the first light beam bundle in the object plane. Thus, by rotation of the beam deflection element, the angle of the excitation beam and hence the illumination angle on the sample can be changed in a selective manner, what is particularly beneficial in case that the light beam bundle is laser light for TIRF (Total Internal Reflection Fluorescence) illumination of the sample.

According to the invention, the second object is achieved by a microscope device in which a scanning device, via a first path and a second path, respectively, is imaged differently in such a manner that, upon coupling of a light beam bundle via the first path, deflection of the light beam bundle by means of a scanning device causes a shift of a position of the light beam bundle in one of an object plane and a plane close to the object plane, whereas, upon coupling of the light bean bundle via the second path, deflection of the light beam bundle by means of the scanning device causes a shift of a position of the light beam bundle in a plane of one of an objective pupil and a plane close to the plane of the objective pupil. According to this solution, the operable beam deflection element does not only serve to select a light beam bundle from a plurality of at least two light beam bundles and to adjust the exit angle of the selected beam, but it also allows to couple the selected beam via a first path or a second path into the microscope objective. The optical elements of these two paths differ in that in the first case the beam deflection element is imaged into the objective pupil whereas in the other case it is imaged into the object plane. Thus, actuation of the scanning device in the first case may cause a shift of the position of the light beam bundle in the object plane, without the beam moving in the objective pupil, whereas in the second case actuation of the scanning device causes a shift of the position of the light beam bundle in the plane of the objective pupil (what enables to change the illumination angle), without the illuminated field being changed thereby. According to the invention only a single light source and only a single scanning device is necessary for optionally adjusting different geometric properties of the light beam bundle in the objective plane in a selective manner, namely on the one hand the position in the object plane and on the other hand the angle of incidence in the object plane. Thereby a very flexible microscope device can be provided for in a particularly simple manner.

According to a preferred embodiment the light beam bundle serves as a FRAP illumination when it is coupled in via the first path, whereas the light beam bundle servers as a TIRF illumination when it is coupled in via the second path.

According to a further preferred embodiment the second light source may be provided for supplying a second light beam bundle which arrives from a direction different to that of the first light beam bundle on the beam deflection element, wherein the beam deflection element is operable for optionally deflecting the second light beam bundle towards the objective. Preferably the second light beam bundle is light for wide-field incident light illumination. A mask, through which the second light beam bundle passes, is located in a plane conjugate to the object plane between the second light source and the beam deflection element, with the image of the mask being shiftable in the sample plane to some extent by selective rotation of the beam deflection element. Thereby movable structured illumination of the sample can be realized.

These and further objects, features and advantages of the present invention will become apparent from the following description when taking in connection with the accompanying drawings which, for purposes of illustration only, show several embodiments in accordance with the present invention.

DETAILED DESCRIPTION OF THE INVENTION

FRAP measurements require the selective activation and deactivation, respectively, of proteins or other cell-active substances by a focused laser beam, and they require the capability to observe the course of the reaction of the cell in incident light fluorescence. FRAP measurements, like, for example, laser micro dissection methods or optical pincers, nowadays are included in the standard repertoire of advanced microscopy. The combining of the beam paths which serve for laser bleaching or laser excitation with those which are necessary for observation in incident light fluorescence usually occurs by means of beam splitters, which, however, either result in loss of light (if they are, for example, designed as semi-transparent mirrors) or, if dichroitic beam splitters are used, which restrict the free choice of the respective wave length.

Figure 1:
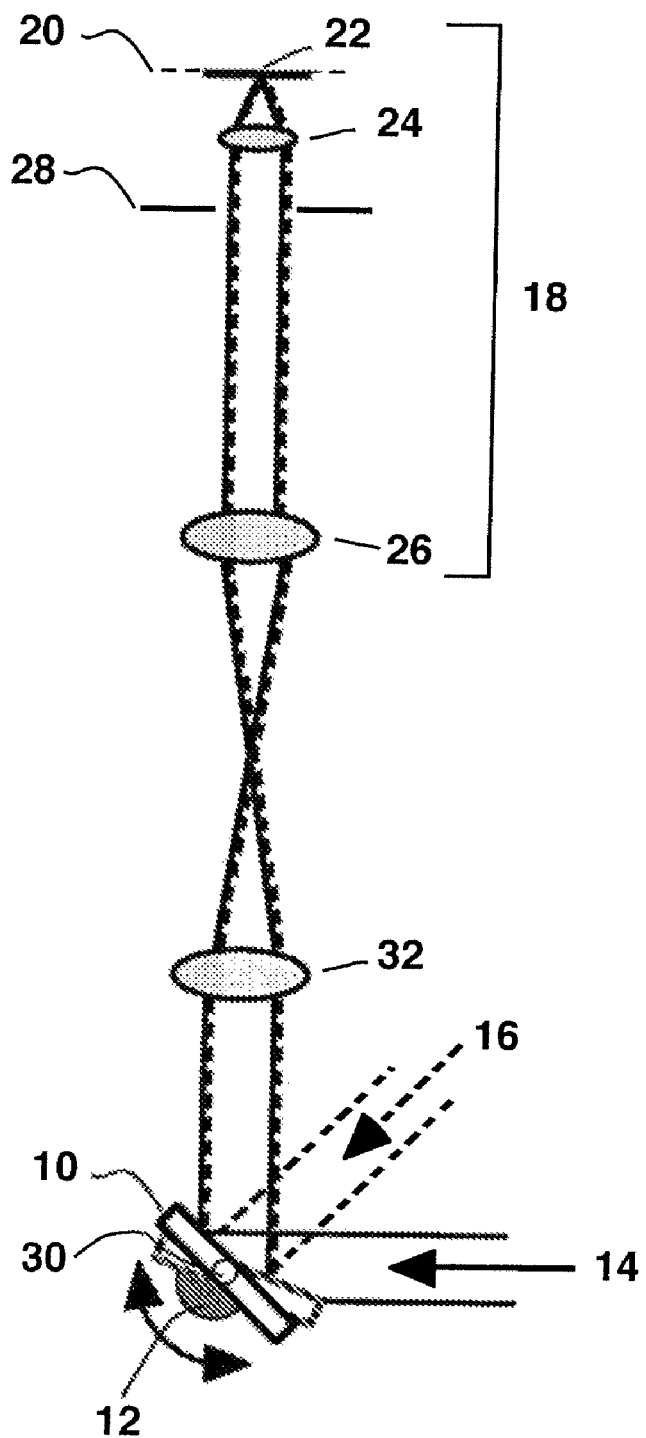
FIG. 1 is a schematic view of a first embodiment of a microscope device according to the invention wherein the beam path is shown schematically.

In the embodiment of a microscope device according to the invention shown in FIG. 1 to this end a quickly rotating beam deflection element 10 is provided which is driven by a drive 12 which is preferably a galvanometer scanner in order to optionally couple either 100% of a laser beam 14 or 100% of an illumination beam 16 necessary for incident light observation into the microscope 18 which comprises an object plane 20 including a sample 22, a microscope objective 24 and a tube lens 26, wherein the plane of the objective pupil is designated by 28. In FIG. 1 the beam deflection element 10 is designed as a planar mirror which is rotatable by the drive 12 around an axis 30 which is perpendicular to the paper plane between a position in which the laser beam 14 is deflected into the microscope 18 and a position in which the illumination beam 16 is deflected into the microscope 18, with both positions shown in FIG. 1. The switching between the two positions can be effected by means of a galvanometer scanner in a few 100 msec, so that, for example, first the laser beam 14 is brought onto the sample 22 for FRAP excitation and immediately thereafter the sample 22 can be illuminated by the illumination beam 16.

The beam deflection element 10 is located in a plane conjugate to the objective pupil plane 28 or close to such a plane, since in this case the rotation of the beam deflection element 10 around the rotation axis 30 can be utilized in order to selectively vary the exit direction of the laser beam 14 (and/or of the illumination beam 16), whereby the position of the (focussed) laser beam 14 (or the illumination beam 16, respectively) in the object plane 20—and hence on the sample 22—can be shifted selectively at least in one dimension. Thereby the position of the illumination beam in the object field can be influenced in a selective manner so that, for example, a field having a defined size and shape can be moved in one dimension as a "light carpet" across the object field. This can be utilized, for example, for the so-called "structured illumination" in order to construct three-dimensional layer images from planar images or for multi-focal confocal images, wherein layer images are composed of a plurality of partial images recorded by means of bar masks or dot masks. To this end a corresponding mask is placed in the beam 14 or the beam 16 at an appropriate location.

The imaging of the beam deflection element 10 in the objective pupil plane 28 in the example shown in FIG. 1 is achieved with the help of a lens 32 which is located between the microscope 18 and the beam deflection element 10. By means of this imaging it is ensured that the illumination angle, i.e. the angle of incidence of the illumination light in the object plane 20, does not or at least not essentially change upon the one-dimensional shifting of the beam bundle in the object plane 20 achieved by selective rotation of the beam deflection element 10 around the axis 30.

A two-dimensional shift of the beam bundle in the object plane 20 may be achieved by locating an additional scan element, which provides for beam deflection perpendicular to the beam deflection achieved by the beam deflection element 10, in a plane conjugate to the objective pupil plane 28, whereby any desired space-time beam profile may be generated in the object plane 20 by combining the actuation of the beam deflection element 10 and of the additional scan element accordingly.

Figure 2:
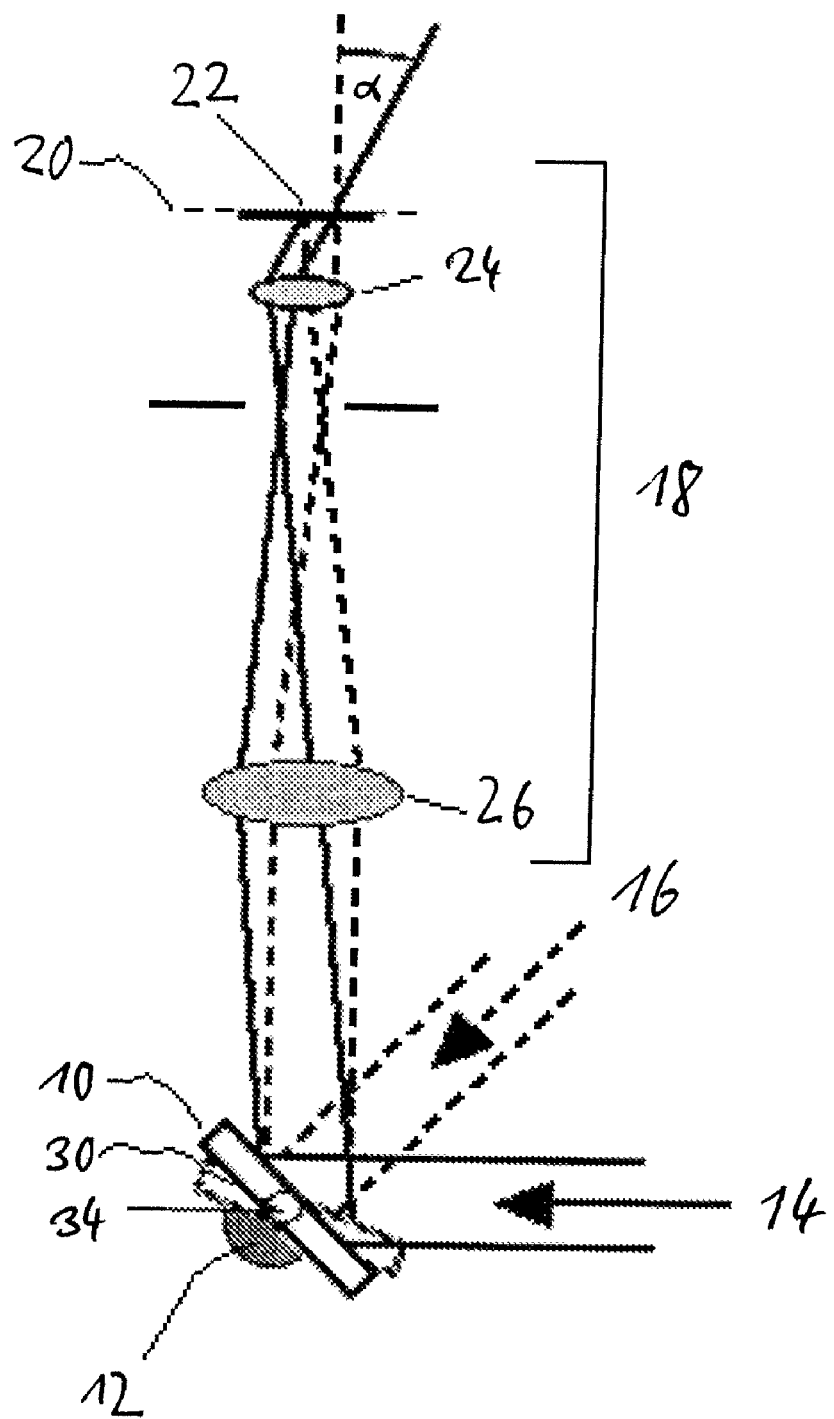
FIG. 2 is a view like FIG. 1, wherein an alternative embodiment is shown.

In FIG. 2 a modified embodiment is shown which differs from the embodiment of FIG. 1 essentially in that the beam deflection element 10 is not located in or close to a plane conjugate to the objective pupil plane 28 but rather in or close to a plane conjugate to the object plane 20. In this case the lens 32 is eliminated and the beam deflection element 10 is imaged by means of the tube lens 26 to infinity and then it is imaged by the microscope objective 24 into the object plane 20. In contrast to the embodiment of FIG. 1 in the embodiment of FIG. 2 consequently rotation of the beam deflection element 10 around the axis 30 causes a one-dimensional shift of the position of the beam bundle in the pupil plane 28 so that the illumination angle (angle of incidence) of the beam bundle in the object plane 20 changes correspondingly, whereas no or no essential shift of the impingement position of the beam bundle in the object plane 20 takes place (in the embodiment of FIG. 1 the beam bundle does not move in the pupil plane 28 upon rotation of the beam deflection element 10, but rather the angle of incidence of the beam bundle with regard to the pupil plane 28 changes; the angle of incidence of the beam bundle, however, remains constant in the embodiment of FIG. 2).

The embodiment of FIG. 2 is particularly suited for TIRF measurements. In general, TIRF measurements become increasingly popular, since thereby observation is selectively restricted to layers located close to a glass-liquid boundary layer. Most of these TIRF measurements nowadays are performed by means of special objectives in incident light configuration. Different methods are described, see, for example, DE 103 09 269 A1 or US 2004/0174523 A1, in order to combine the beam path of lasers usually used for TIRF measurements and the beam path for the usual wide-field incident light image.

With regard to these known systems the solution according to FIG. 2 is significantly simplified, since on the one hand by rotation of the beam deflection element 10 around the axis 30 it is possible to switch between a TIRF laser beam 14 and an incident light illumination beam 16 in a simple manner, and on the other hand by rotating the beam deflection element 10 around the axis 30 the illumination angle of the light beam 14 (or 16) deflected into the microscope 18 with regard to the object plane 20 (in FIG. 2 this angle is designated by $\alpha$) can be adjusted in a selective manner, i.e. the change of the beam exit angle with regard to the intermediate image plane 34, in which the beam deflection element 10 and the rotation axis 30 thereof, respectively, are arranged, causes a corresponding adjustment of the TIRF angle $\alpha$ in the object plane 20. If the latter angle becomes larger than the angle of total reflection between the object carrier and the sample, total internal reflection and the creation of a spatially limited evanescent field in the sample occur. The penetration depth of the evanescent field in the sample depends on the selected TIRF angle $\alpha$, which can be varied, as already mentioned, in turn via the adjusted deflection angle of the deflection element 10 in one dimension.

Figure 3:
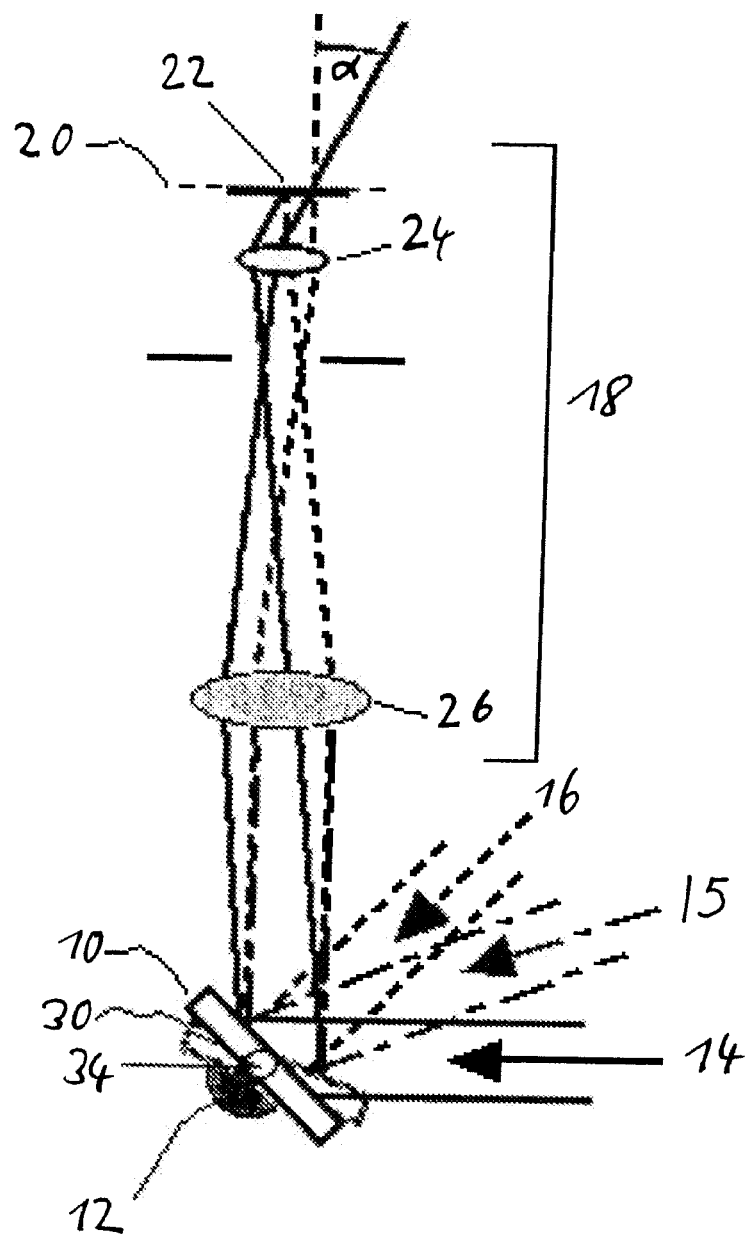
FIG. 3 is a view like FIG. 2, wherein a modified embodiment is shown.

An arrangement as shown in FIG. 2 also may be modified in such a manner that it serves to combine three or more beam paths one after the other and to simultaneously influence the geometric beam properties in the object plane 20. A corresponding example is shown in FIG. 3, wherein the beam deflection element 10 is rotatable around the axis 30 in order to switch between a wide-field incident light illumination beam 16, a FRAP laser 15 and a TIRF laser 14, respectively, as the illumination source. Also in this case, the beam deflection element 10 does not only serve for beam selection but in addition it allows influencing of at least one geometric property of one of the selected beams in the object plane 20. In the embodiment of FIG. 3 the beam deflection element 10 is located in or close to a plane 34 conjugate to the object plane 20, i.e. in or close to an intermediate image plane.

Thereby it is possible to switch not only between the three illumination beams 14, 15 and 16 by means of the beam deflection element 10, but in addition the illumination angle $\alpha$ in the object plane 20 can be adjusted as in the embodiment of FIG. 2 by rotating the beam deflection element around the axis 30, i.e. the TIRF angle $\alpha$ can be adjusted for the TIRF beam 14 by means of the beam deflection element.

Shifting of the FRAP beam 14 in the object plane 20, i.e. selective bleaching of the sample 22 by means of the FRAP beam 15, can be realized by using an additional scanning device (not shown) which correspondingly deflects the FRAP beam 15 in one or two dimensions before it impinges on the beam deflection element 10. In this case the beam deflection element 10 only has the function to select the FRAP beam 15 for illumination of the sample.

Corresponding two-dimensional scanning devices are described, for example, in U.S. Pat. No. 6,433,908 B2 and DE 103 28 308 A1. Such scanning devices have in common that two adjustable mirrors provide for independent beam deflection in two directions in space, which is translated by a scanning lens into a corresponding scanning movement of the beam focus in the intermediate image plane 34, and hence—after passing through the beam path of incident light of the microscope 18—also in the object plane 20.

According to a modification of the embodiment of FIG. 3 the beam deflection element 10 may be located, as in the embodiment of FIG. 1, in a plane conjugate to the pupil plane, wherein in this case in addition to the switching between the three incident light beams 14, 15 and 16 a shifting of the beam position in the object plane 20 by rotating the beam reflection element 10 around the axis 30 is enabled. In order to adjust the TIRF angle $\alpha$ then a corresponding scanning device would be necessary, whose imaging plane should lie in a plane conjugate to the pupil plane 28.

In FIG. 4 an embodiment is shown wherein a light beam 41, which preferably consists of laser light, is focused by means of a subsequent scanning device 42 in a scanning plane 50 and can be freely positioned therein. By actuating a beam deflection element 10, depending on the path taken by the selected light beam before it is deflected into the microscope 18, optionally illumination including shifting of the beam position in the object plane 20 with essentially constant illumination angle, or a variation of the illumination angle in the object plane 20 with essentially constant beam position in the object plane 20, can be realized. To this end, by rotating the beam deflection element 10 around the axis 30, one can select a first optical path wherein the light beam bundle 44 leaving the scanning device 42 can be deflected directly into the tube lens 26 of the microscope 18 (see FIG. 4a) and a second optical path, wherein the incident beam bundle 44 first is passed to a mirror 46a, from there to a mirror 46b, from there through a lens 48 to a mirror 46c and from there via two mirrors 46d and 46e again onto the beam deflection element 10 in such a manner that the beam from there is deflected into the tube lens 26 of the microscope 18.

The beam deflection element 10 preferably is located in or close to an intermediate image plane, i.e. a plane conjugate to the object plane 20.

The scanning device 42 focuses the light beam bundle 44 into a plane 50 which is located between the scanning device 42 and the beam deflection element 10. If the beam deflection element 10 is switched to the first optical path (see FIG. 4a), the vision plane 50 is imaged to the object plane 20, i.e. it lies in an intermediate image plane, so that in this configuration the position of the light beam in the sample plane 20 may be shifted by actuating the scanning element 42, as it is beneficial for FRAP measurements, i.e. in the illumination mode of FIG. 4a the sample 22 may be scanned by the light from the light source 40 by means of the scanning device 42.

Figure 4A:
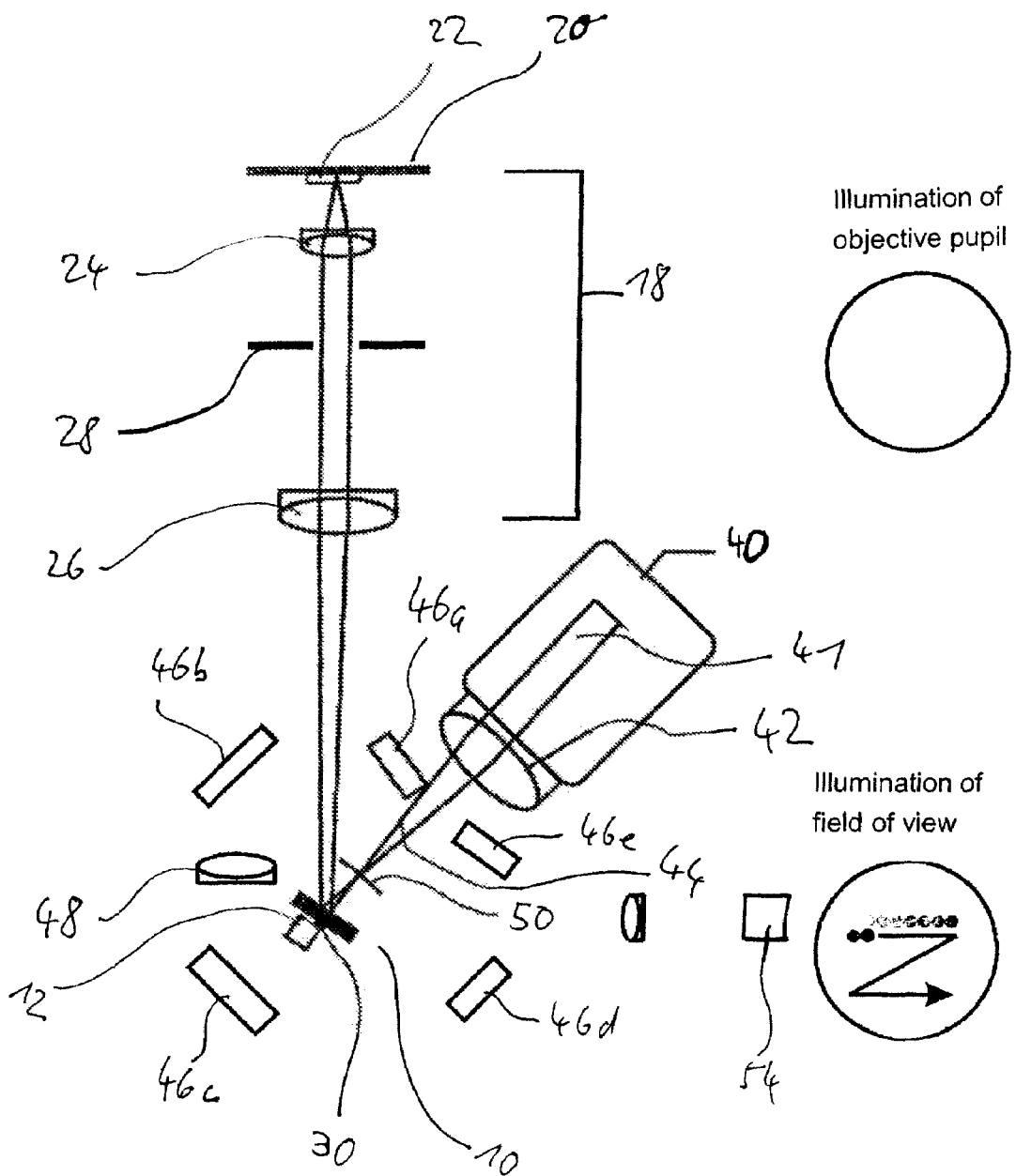
FIG. 4a is a schematic view of a further embodiment of the invention in a first mode of operation, wherein further the illumination of the objective pupil and the field of view is indicated.
Figure 4B:
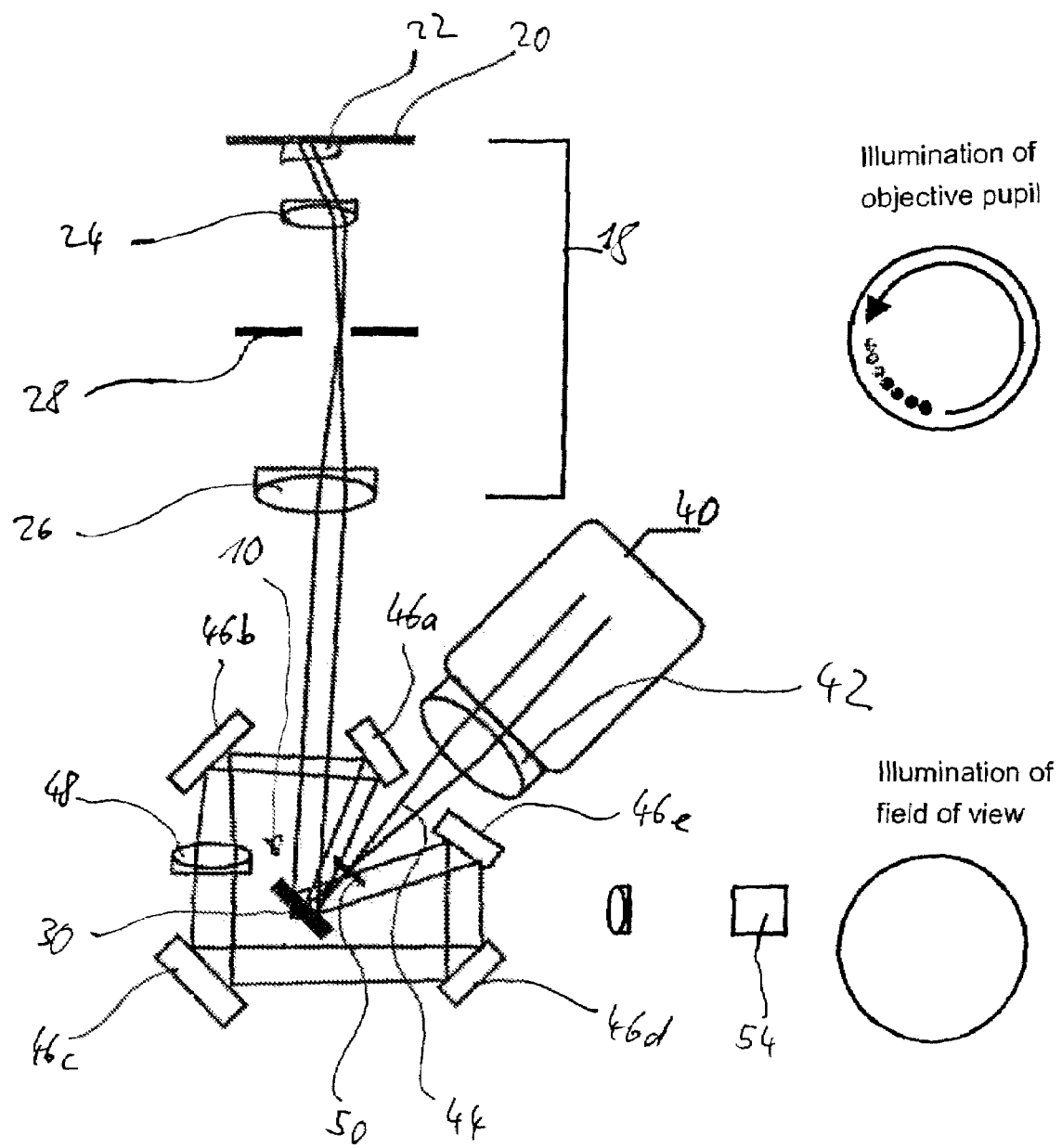
FIGS. 4b and 4c are a view like FIG. 4a, respectively, wherein a second and a third mode of operation, respectively, is shown.

In the illumination mode of FIG. 4b, wherein the light beam bundle 44 from the beam deflection element 10 is sent via the second path, i.e. via the mirrors 46a to 46e and the lens 48, the focal plane 50 of the scanning element 42 is not imaged to the object plane 20 but rather to the pupil plane 28, i.e. in this position of the beam deflection element 10 the plane 50 lies in a plane conjugate to the pupil plane 28. In this case shifting of the position of the light beam bundle 44 in the plane 50, by actuating the scanning device 42, causes a corresponding movement of the light beam in the pupil plane 28 which movement in turn is translated by the microscope objective 24 into a corresponding variation of the illumination angle in the object plane 20. In the illumination mode of FIG. 4b the light from the light source 40, for example, may be used for TIRF measurements wherein the TIRF angle can be varied by actuating the scanning device 42.

Figure 4C:
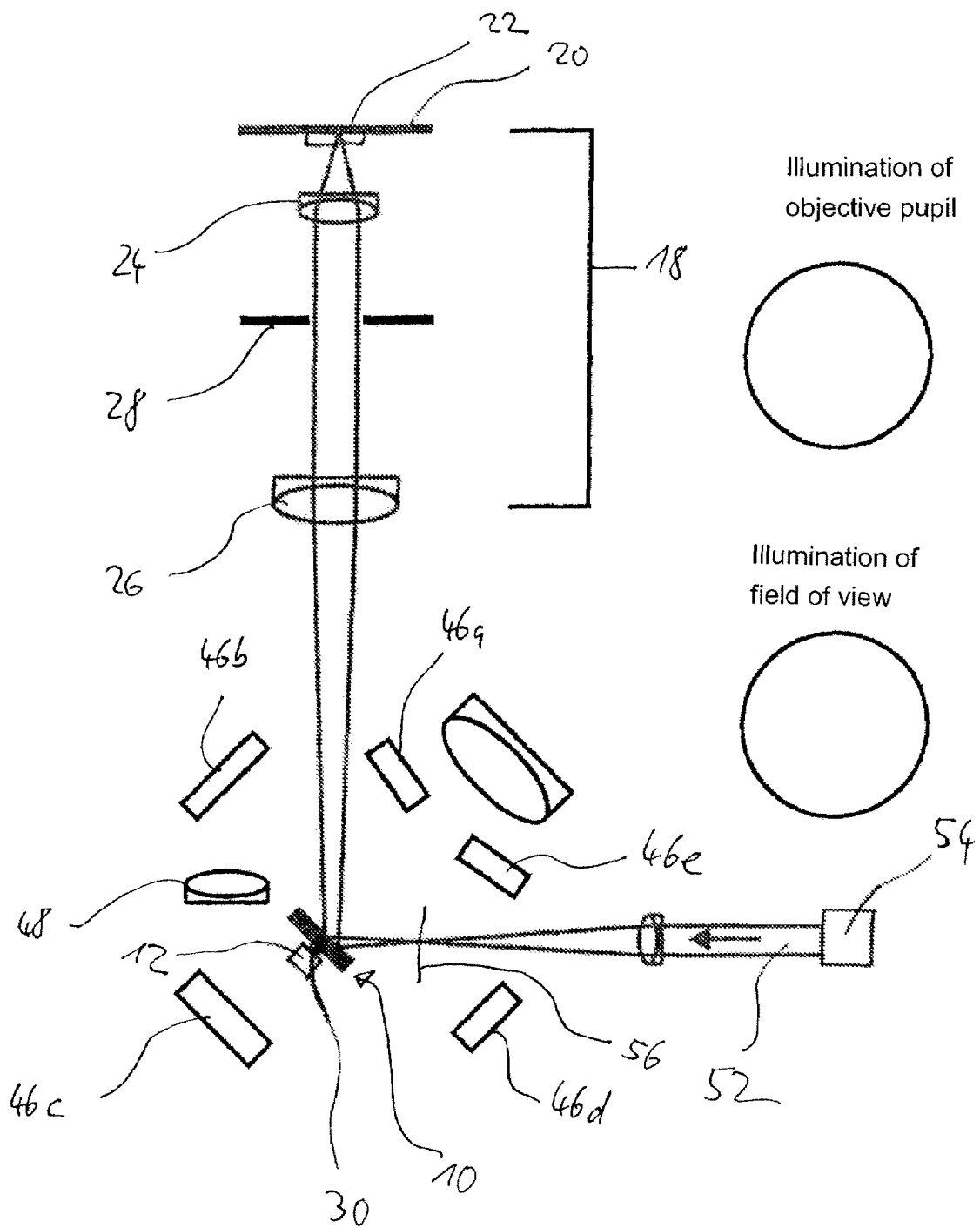

According to FIG. 4c the beam deflection element 10 may take a third rotational position in which it serves to deflect a second light beam 52 from second light source 54, which has a different direction from that of the light beam bundle 44 from the first light source 40, into the tube lens 26 of the microscope 18 in order to provide, for example, for wide-field incident light illumination. Thereby the beam deflection element 10 can be utilized for switching between three different illumination modes according to FIGS. 4a, 4b and 4c, respectively.

If the rotation axis 30 of the beam deflection element 10 is not located directly in an intermediate image plane but rather only close to such an intermediate image plane, by a slight rotation of the deflection element 10 around the axis 30 a slight shift of the illuminated object field can be achieved, i.e. the second light beam 52 moves in one dimension in the object plane 20, wherein, however, the second light beam 52 also moves in the pupil plane 28 and hence the illumination angle in the object plane 20 changes accordingly. However, if only a small shift of the illuminated object field, as it is necessary for structured illumination, is realized, the movement of the beam 52 in the pupil plane 28 is negligible.

Figure 4D:
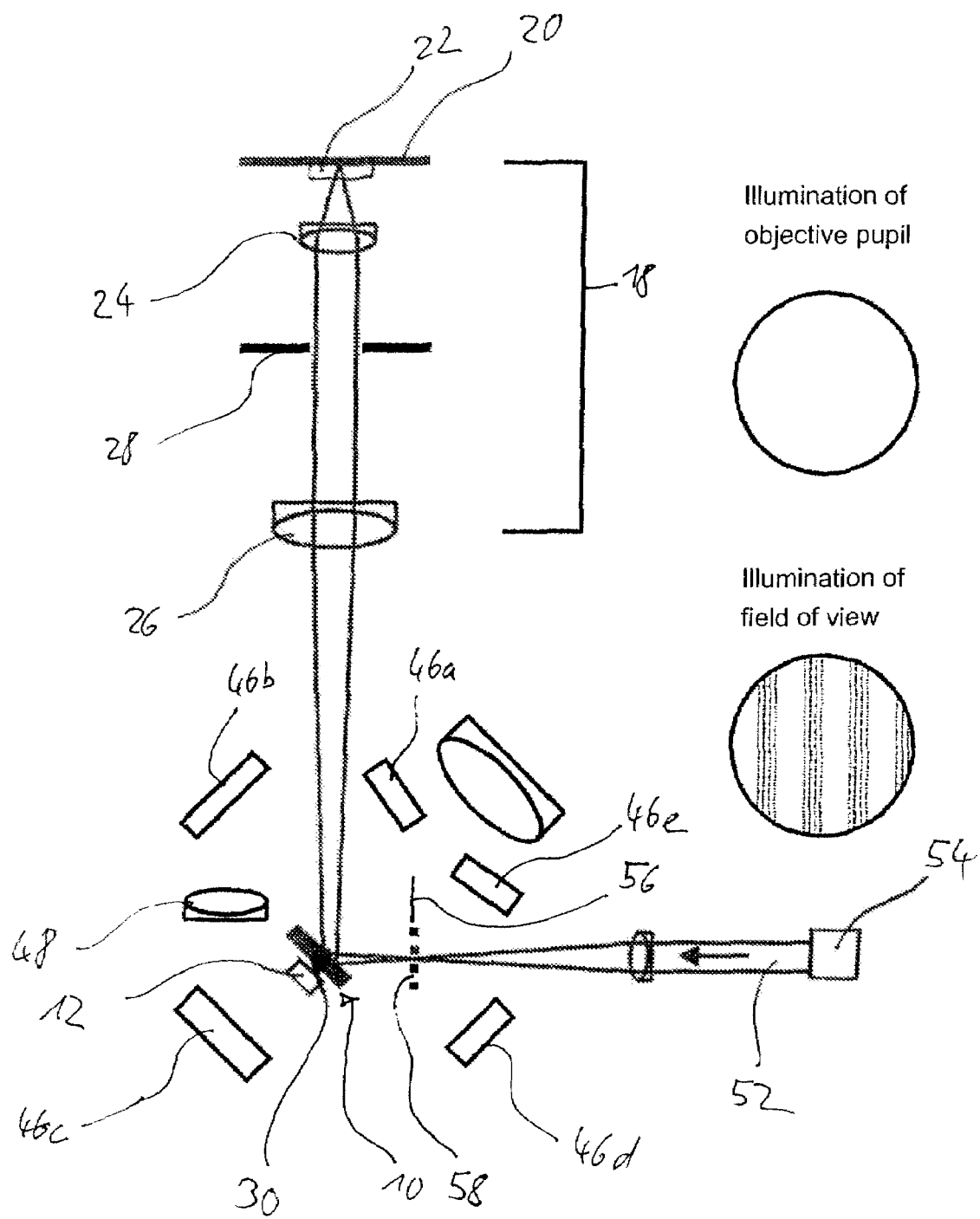
FIG. 4d is a view like FIG. 4c, wherein a modified embodiment is shown.

This may be used for a variation of the path of the illumination beam, as it shown in an example in FIG. 4d, wherein in an intermediate image plane, i.e. in a plane 56 conjugate to the object plane, a mask 58 is introduced which, for example, may be designed as a bar mask or a dot mask. The mask 58 is imaged accordingly onto the sample 22 and into the object plane 20, respectively, where it creates a corresponding bar pattern or dot pattern due to the passage of the second light beam 52 through the mask 58. This pattern then may be moved across the sample 22 by a slight rotation of the deflection element 10 around the axis 30. Thereby a so-called structured illumination and a multifocal confocal illumination, respectively, can be realized, i.e. a method for obtaining layer images with simultaneous suppression of information from planes outside the focal plane.

While various embodiments in accordance with the present invention have been shown and described, it is understood that the invention is not limited thereto, and is susceptible to numerous changes and modifications as known to those skilled in the art. Therefore, this invention is not limited to the details shown and described therein, and includes all such changes and modifications as encompassed by the scope of the appended claims.

What is claimed is:

1. A microscope device for examining a sample, comprising a microscope objective, a light source for generating a light beam bundle, a scanning device operable to selectively deflect said light beam bundle, a beam deflection element operable to selectively couple said light beam bundle deflected by said scanning device via a selected one of a first path and a second path into said microscope objective, wherein a focal or vision plane of said scanning device, via said first path and said second path, respectively, is imaged differently in such a manner that, upon coupling of said light beam bundle via said first path, deflection of said light beam bundle by means of said scanning device causes a shift of a position of said light beam bundle in one of an object plane and a plane close to said object plane, whereas, upon coupling of said light beam bundle via said second path, deflection of said light beam bundle by means of said scanning device causes a shift of a position of said light beam bundle in a plane of one of an objective pupil and a plane close to said plane of said objective pupil; wherein a tube lens is arranged in front of said microscope objective; wherein in said first path said light beam bundle is deflected by said beam deflection element directly into said tube lens, without any imaging elements being located between said beam deflection element and said tube lens.

2. The microscope device of claim 1, wherein said light source is a laser.

3. A microscope device for examining a sample, comprising a microscope objective, a light source for generating a light beam bundle, a scanning device operable to selectively deflect said light beam bundle, a beam deflection element operable to selectively couple said light beam bundle deflected by said scanning device via a selected one of a first path and a second path into said microscope objective, wherein a focal or vision plane of said scanning device, via said first path and said second path, respectively, is imaged differently in such a manner that, upon coupling of said light beam bundle via said first path, deflection of said light beam bundle by means of said scanning device causes a shift of a position of said light beam bundle in one of an object plane and a plane close to said object plane, whereas, upon coupling of said light beam bundle via said second path, deflection of said light beam bundle by means of said scanning device causes a shift of a position of said light beam bundle in a plane of one of an objective pupil and a plane close to said plane of said objective pupil; further comprising a second light source for emitting a second light beam bundle which impinges on said beam deflection element from a direction different to that of said light beam bundle, wherein said beam deflection element is operable to deflect said second light beam bundle towards said microscope objective.

4. The microscope device of claim 3, wherein said second light beam bundle comprises light for wide-field incident light illumination.

5. The microscope device of claim 3, wherein a mask is arranged between said second light source and said beam deflection element in or close to a plane conjugate to said object plane, with said second light beam bundle passing through said mask.

6. The microscope device of claim 3, wherein said beam deflection element is rotatable by a drive in order to selective change an exit direction of said second light beam bundle from beam deflection element, with said beam deflection element being located close to a plane conjugate to said object plane.

7. The microscope device of claim 6, wherein said beam deflection element, upon actuation, is rotatable by a drive in order to couple said light beam bundle via said first path or said second path into said microscope objective or to couple said second light beam bundle into said microscope objective.

8. The microscope device of claim 6, wherein said drive is a galvanometer.

* * * * *